T. G. KELSO.
HUSKING MACHINE.
APPLICATION FILED APR. 27, 1910.

995,257.

Patented June 13, 1911.

2 SHEETS—SHEET 1.

Witnesses
C. C. Richardson
W. S. McDowell

Inventor
Thomas G. Kelso,
By Victor J. Evans
Attorney

T. G. KELSO.
HUSKING MACHINE.
APPLICATION FILED APR. 27, 1910.
995,257.
Patented June 13, 1911.
2 SHEETS—SHEET 2.
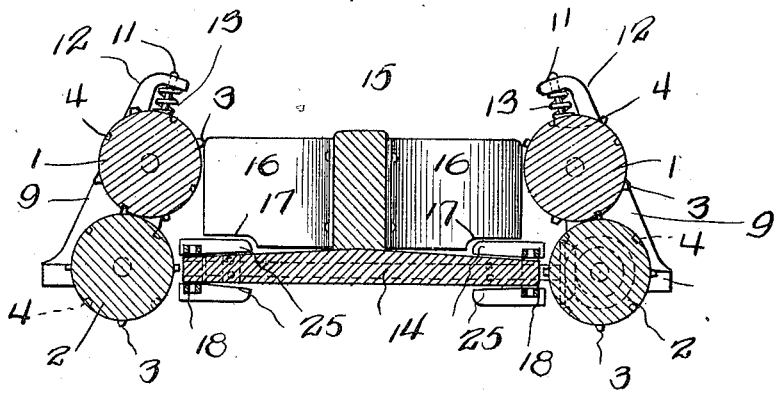
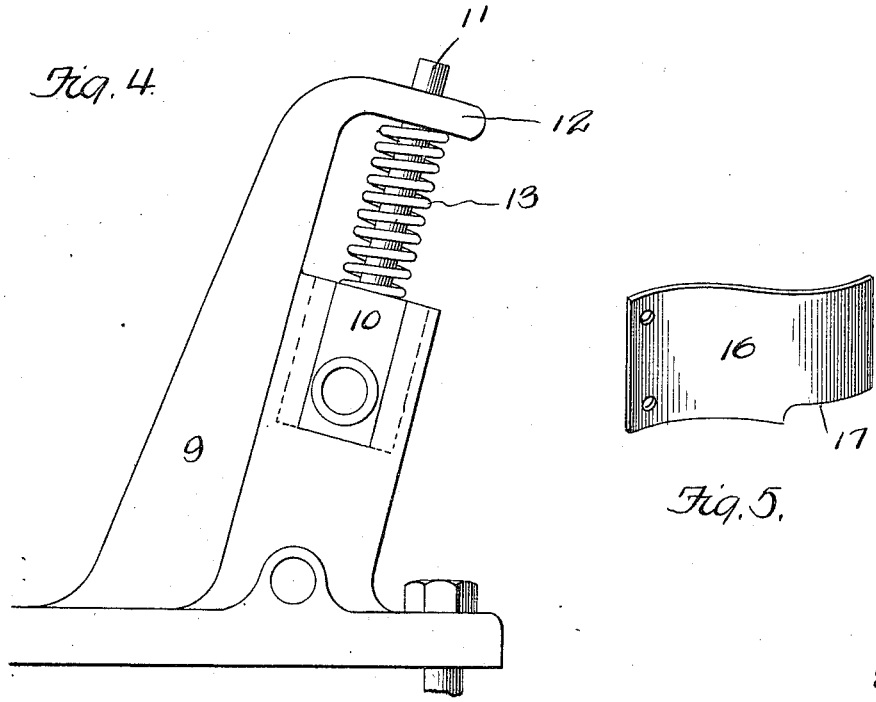
Witnesses
C. C. Richardson
W. S. McDowell
Inventor
Thomas G. Kelso,
By Victor J. Evans
Attorney

UNITED STATES PATENT OFFICE.

THOMAS G. KELSO, OF NEW SALEM, INDIANA.

HUSKING-MACHINE.

995,257.  Specification of Letters Patent.  Patented June 13, 1911.

Application filed April 27, 1910. Serial No. 557,955.

*To all whom it may concern:*

Be it known that I, THOMAS G. KELSO, a citizen of the United States, residing at New Salem, in the county of Rush and State of Indiana, have invented new and useful Improvements in Husking-Machines, of which the following is a specification.

The present invention provides a novel mechanism for removing the husks from ears of corn, said mechanism being of such formation as to be used either in connection with a corn harvesting machine or independently thereof, the purpose being to provide pairs of husking rolls and to combine therewith means for positively moving the ears along the rolls and other means for directing the ears toward the husking rolls to insure the latter taking hold of the husks and stripping the same from the ears.

The husking mechanism comprises two pairs of husking rolls arranged at an opposite inclination, a bottom extending across the space formed between the pairs of husking rolls and oppositely inclined from a medial line, a divider in line with the crest of the bottom, and yielding pressure devices attached to opposite sides of the divider and extending over the bottom to force the ears toward the husking rolls as the said ears are carried rearward by feeders moving over the said bottom.

The invention also contemplates a novel arrangement of parts and peculiar mountings for the husking rolls whereby they are adapted to yield to prevent injury to the teeth of the drive gears or to the rolls themselves.

The invention consists of the novel features, details of construction and combination of parts, which hereinafter will be more particularly set forth, illustrated in the accompanying drawings, and pointed out in the appended claim.

Figure 1:
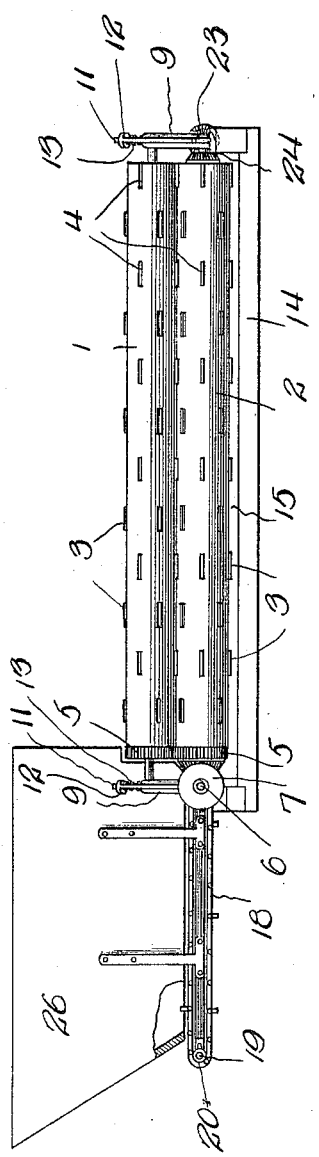
Figure 2:
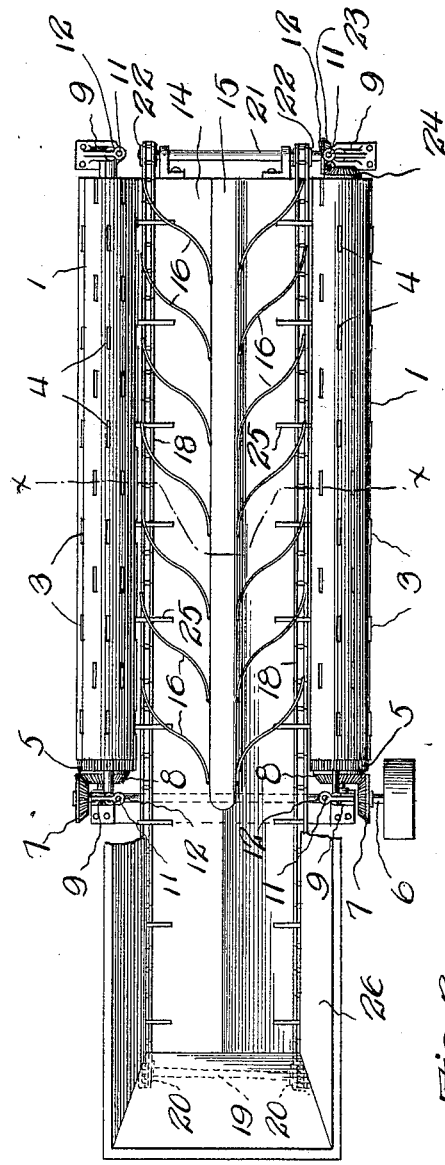

Referring to the drawings, forming a part of the application, Figure 1 is a side view of a husking mechanism embodying the invention. Fig. 2 is a top plan view thereof. Fig. 3 is a cross section on the line *x—x* of Fig. 2. Fig. 4 is a detail view of one of the journal bearings of a husking roll. Fig. 5 is a perspective view of one of the pressure devices.

Corresponding and like parts are referred to in the following description, and indicated in all the views of the drawings, by the same reference characters.

The husking rolls are provided in pairs and have an approximately horizontal arrangement and are transversely spaced. The upper rolls 1 of each pair of husking rolls are arranged nearer each other than the lower husking rolls 2, with the result that the pairs of husking rolls have an opposite inclination. The husking rolls are studded upon their outer surfaces with short bars 3 and with grooves 4, the latter matching with the short bars and coöperating therewith to insure a firm gripping of the husks to be stripped from the ears. The husking rolls are geared to rotate simultaneously and with the rolls of each pair in a direction so that their inner portions travel in the same direction to draw the husks from the ears and discharge said husks laterally. The rolls of each pair are connected at one end by intermeshing spur gears 5 and one roll of each pair is geared to a transverse shaft 6, which receives power from any suitable source. Bevel gears 7 secured to the shaft 6 mesh with companion bevel gears 8 fastened to the adjacent ends of a husking roll of each pair. Brackets 9 are provided and constitute mounts for the husking rolls and these brackets are inclined so as to cause the husking rolls when the parts are assembled to incline in opposite directions with the upper rolls 1 nearer to each other than the lower rolls 2. The lower husking rolls 2 are mounted in fixed bearings, whereas the upper husking rolls 1 are mounted in movable bearings 10, slidably mounted in ways formed in the upper portions of the brackets, the bearings 10 having stems 11 which pass through openings in overhanging portions 12 of the brackets, springs 13 being mounted upon the stems 11 and normally exerting a downward pressure upon the bearings 10 to hold the rolls 12 in engagement with the rolls 2.

The space between the pairs of husking rolls is closed by means of a support or bottom piece 14, which latter is oppositely inclined from a medial line to direct the ears toward the husking rolls. A divider 15 is located in line with the crest or ridge or the bottom piece 14 and consists of a strip having a vertical arrangement. The purpose of the divider is to direct the ears either to one or the other set of husking rolls and also to form a support for a series of yielding pressure devices 16, which consist of spring plates having their inner vertical edges attached to the divider 15 and extending outwardly from said divider and inclining rearwardly. The function of the spring plates or yielding pressure devices 16 is to direct the ears of corn laterally and insure their coming in contact with the husking rolls, which latter take hold of the husks and pull the same from the ears. The lower outer corners of the spring plates are cut away, as indicated at 17, to provide ample clearance for the feeding devices whereby the ears are moved over the bottom piece 14 and along the husking rolls. The divider 15 terminates some distance from the forward end of the bottom or supporting piece 14.

A feeder is supplied for each pair of husking rolls and is arranged to operate over the outer portion of the bottom piece 14. While the feeder may be of any construction so as to effect the desired purpose it is preferred to have the same consist of an endless chain 18, which is supported at opposite ends and has its upper run extending over the bottom piece and its lower run coming beneath said bottom piece. It is to be understood that two endless chains are provided and that they are operated simultaneously. A shaft 19 is mounted at the front end of the supporting piece 14 and is provided with sprocket wheels 20 around which the forward ends of the endless chains 18 pass. A shaft 21 is arranged in the rear of the bottom piece 14 and is mounted in suitable bearings and is also provided with sprocket wheels 22, which support the rear ends of the endless chains. A gear wheel 23 fastened to one end of the shaft 21 meshes with a gear wheel 24 secured to the rear end of one of the husking rolls. By the means just described the endless chains are secured to rotate simultaneously with the husking rolls and they are driven in a direction to cause their upper portions to move rearwardly over the supporting piece 14. Lateral projections 25 are located at intervals in the length of the endless chains and extend vertically a short distance to insure engagement with the ears so as to move the same rearwardly over the bottom piece 14.

A hopper 26 is located over the receiving portion of the supporting piece 14 and receives the ears to be stripped of the husks. The ears may be supplied to the hopper 26 in any manner. In the practical operation of the mechanism the ears are delivered from the hopper 26 and moved over the supporting piece 14 by means of the feeders 18. The husking rolls being set in motion grasp the husks and the latter are stripped from the ears by being drawn between the husking rolls. As the ears are carried rearward over the supporting piece 14 they are at the same time moved outwardly by the combined action of the pressure pieces 16 and the opposite inclination of the side portions of the bottom piece 14.

It is observed that the rolls 2 are located opposite the edges of the support 14 with their upper portions in a higher plane than the surface of the support, with the result that the spaces between the rolls 1 and 2 are arranged to the best possible advantage to enable the husking rolls to take hold of and strip the husks from the ears. The rolls 1 are arranged with their inner portions overhanging the outer edge portions of the support, thereby preventing the ears from passing over the upper rolls and causing them to positively travel in the space formed between the inner portions of the pairs of rolls and the outer edge portion of the support.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

A husking mechanism comprising pairs of husking rolls having an opposite inclination, a bottom piece closing the space between the pairs of husking rolls and extending beyond the same at one end, a hopper mounted upon the projecting end of the bottom piece, the latter having its upper side laterally inclined in opposite directions from a medial line, a divider mounted upon the bottom piece and terminating at one end with the rear wall of the hopper, spring plates secured at their inner ends to the divider and inclining outwardly and rearwardly and having their outer lower edge portions cut away, and endless chains arranged to operate over the outer portions of the bottom piece and beneath the outer ends of said spring plates, said endless chains being provided at intervals in their length with inwardly and upwardly extending projections.

In testimony whereof I affix my signature in presence of two witnesses.

THOMAS G. KELSO.

Witnesses:
  CHAS. W. WILSON,
  CLYDE SPEER.

---

Copies of this patent may be obtained for five cents each, by addressing the "Commissioner of Patents, Washington, D. C."